UNITED STATES PATENT OFFICE.

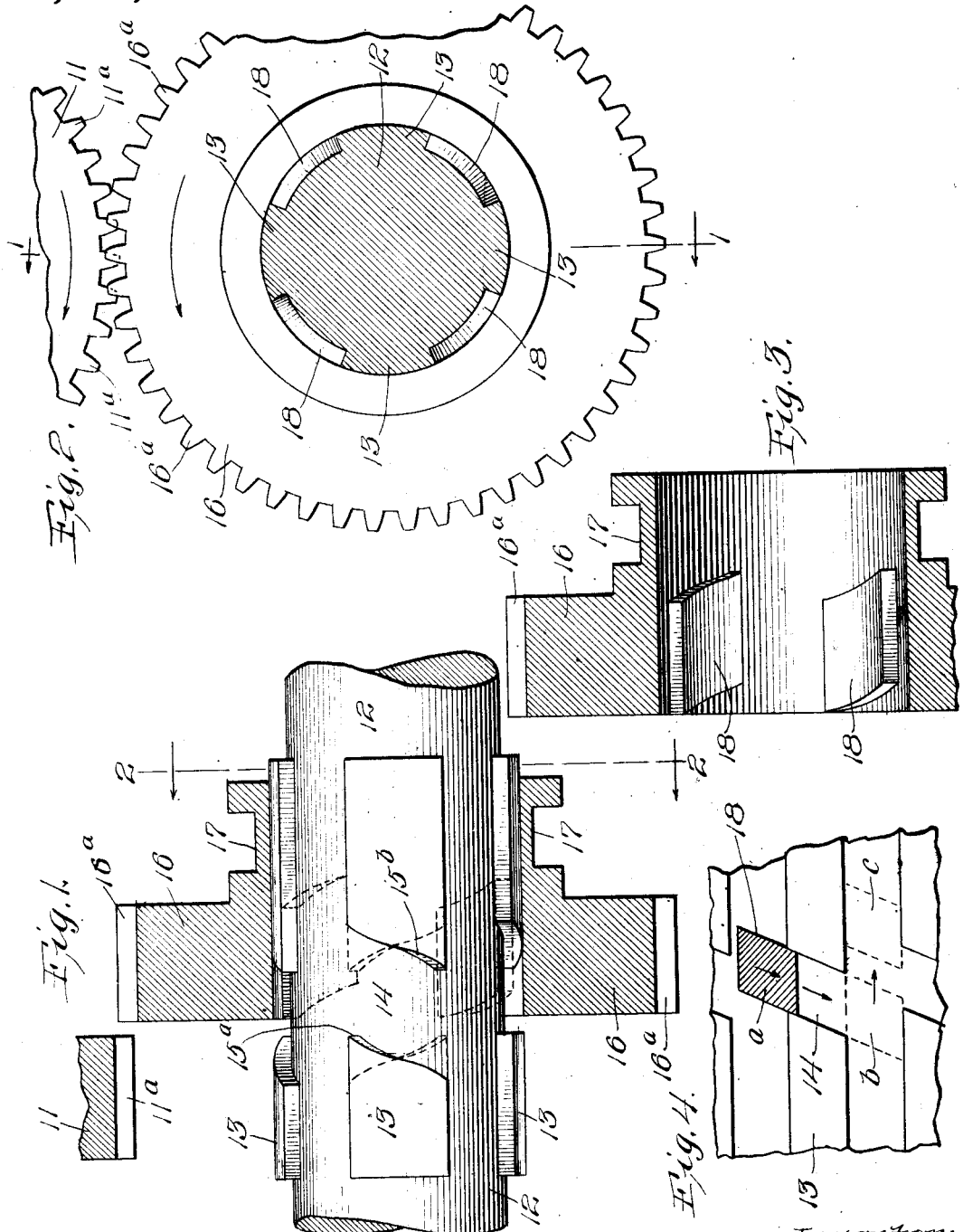

LEON J. CAMPBELL, OF CHICAGO, ILLINOIS, ASSIGNOR TO JAMES T. HEALY, TRUSTEE, OF CHICAGO, ILLINOIS.

POWER-TRANSMISSION GEARING.

1,034,871.   Specification of Letters Patent.   Patented Aug. 6, 1912.

Application filed April 27, 1912. Serial No. 693,550.

*To all whom it may concern:*

Be it known that I, LEON J. CAMPBELL, a citizen of the United States, and a resident of Chicago, in the county of Cook and State of Illinois, have invented certain new and useful Improvements in Power-Transmission Gearing; and I do hereby declare that the following is a full, clear, and exact description thereof, reference being had to the accompanying drawings, and to the letters of reference marked thereon, which form a part of this specification.

This invention relates to improvements in sliding gear transmission devices, and more particularly to that form of such devices whereby power may be transmitted from one shaft to another parallel shaft by the meshing or interlocking of the teeth of two gear wheels mounted on said shafts.

It is the object of this invention to provide a construction whereby one of said gear wheels, constituting a sliding or shifting member, may be brought into positive engagement with a driving member at the time of the initial contact between the teeth of said members.

The invention consists of the matters hereinafter described and more particularly pointed out in the appended claims.

In the drawings—Figure 1 is a side view of the members embodying the invention showing the shaft in elevation, the driven gear member mounted thereon, in longitudinal section, and a portion of the driving gear member also in longitudinal section; Fig. 2 is a cross-sectional view taken on line 2—2 of Fig. 1; Fig. 3 is a longitudinal cross-section of the driven gear member removed from the driven shaft; Fig. 4 is a diagrammatic view, showing the coacting parts on the shaft and its associate gear member, developed on a plane.

Referring to Fig. 1 of the drawing, 11 indicates a portion of a toothed spur gear wheel or driving member, rigidly mounted upon a power driven shaft, the teeth of said driving member 11 being indicated by 11ᵃ.

12 indicates a driven shaft, the axis of the same lying in the same plane with, and laterally distant from the axis of said driven shaft. 13 indicates a series of longitudinal ribs or projections on said driven shaft, preferably made integral with the same. Said ribs or projections are located adjacent to the driving spur gear 11, and are of a length sufficient to permit the longitudinal sliding motion on said shaft of a gear wheel or driven member 16 through a distance required for the shifting of said gear wheel into and out of mesh with the gear wheel or driving member 11. Said projections are equally spaced about the circumference of the shaft, and are of equal circumferential width, thereby forming between them a like number of equal longitudinally extending spaces or grooves. Each of said projections or ribs 13, is transversed by an oblique groove, the side or edge surfaces 15ᵃ, 15ᵇ, of which are parallel with each other and equally inclined to the axis of the driven shaft 12. The oblique grooves thus arranged, form a series of such grooves, arranged in annular order about the circumference of the said shaft 12. The oblique surfaces 15ᵃ, 15ᵇ form, in effect, a series of cam surfaces on the shaft.

16 indicates a toothed or spur gear wheel or driving member which is loosely mounted upon the shaft 12, and is adapted to have longitudinal sliding movement along and also rotative movement about said shaft; the cylindric surface of the aperture or bore of said member having bearing upon the ribs 13, 13 of the shaft. About the periphery of said driven member 16 are located a plurality of teeth similar in form to the teeth of the driving member 11 and adapted to mesh perfectly with said teeth. 17 indicates an annular groove, formed in the outer surface of said driven member 16. Said groove is adapted to be engaged by any form of manually operable actuating device, whereby endwise sliding movement upon the shaft may be given to said driven member 16. Upon the inner surface of the driven member 16 are located a series of lugs 18, preferably integral with said driven member. Said lugs are equally and annularly arranged around the bore or aperture of the said member 16. The circumferential width of said lugs is the same as that of the longitudinal grooves between the ribs or projections 13 of the shaft 12 and affords sliding contact between the lateral surfaces of said lugs and the side margins of said ribs. Said lugs are also adapted to enter and to pass entirely through the oblique slots 14 of the ribs 13, the surfaces of the sides of said lugs, which coact with the cam surfaces 15ᵃ, 15ᵇ of the said slots, being inclined to substantially conform to the inclination or obliquity of said cam surfaces 15ᵃ, 15ᵇ. The lugs 18 are so located upon the inner circumference of the driven member 16, that when the relative position of the driving member and driven member is such that the teeth 11ᵃ and 16ᵃ are initially or partially interlocked to an extent sufficient to effect the rotation of the driven member about the shaft, the said lugs will be located circumferentially in line with the adjacent ends of the slots 14 and in position to enter the same when the driven member is turned on the shaft in a direction to carry the lugs toward said grooves. The inclination or obliquity of said slots is such, that the driven member 16 will be thrown or shifted into full engagement with the driving member 11 by the passage of the lugs completely through the said slots, or by the passage of each lug from one of the longitudinal grooves through the oblique groove in one of the ribs into the next adjacent longitudinal groove.

When the several members are in the position shown in Figs. 1 and 2 of the drawing, the spur gear wheels are slightly separated, and the driven shaft 12 is entirely independent of the driving shaft, which, in this position of the parts may continue to rotate without transmitting motion to the driven shaft. For the proper transmission of power from the driving shaft to the driven shaft, the complete meshing or interlocking of the teeth of the driven member 16 and the teeth of the driving member 11 must be effected. To bring about this engagement between the said teeth, the driven member 16 is moved or shifted by the manually operable devices employed for the purpose, acting in the annular groove 17 of the driven member 16, so as to shift said member longitudinally on the shaft toward the driving member 11. A partial or slight engagement of the lateral edges of the teeth 11ᵃ and 16ᵃ will take place when the ends of the teeth are brought or pressed together through the pressure exerted on the shifting gear member by the operator. Such partial or initial engagement of the said ends of the teeth results in the rotation of the driven member 16 about the shaft 12; the said driven member being at this time free to turn on the shaft owing to the entrance of the lugs 18 into the oblique grooves 14 and the passage of the same through said grooves. As the lugs so pass through the oblique slots, the cam action, due to the obliquity of the same, carries the driven member farther forward on the shaft, in a direction toward the driving member, and into full engagement with the latter. Upon the completion of the passage of the lugs through the slots, the said lugs come in contact with the parts of the ribs that are in line with the oblique slots, thereby preventing any further rotation of the gear member 16 about the shaft. The latter then rotates with the said gear member.

The operation of the parts will be better understood by reference to the diagrammatic view, Fig. 4, wherein the ribs, grooves and one lug are shown as developed on a plane surface. In this view, the lug is shown in full lines at $a$, as having entered to a slight extent one of the oblique grooves, and said lug is also shown by dotted lines, at $b$, in its driving position or as bearing against one of the longitudinal ribs, after its passage through said oblique slot, and at $c$, when fully retracted, and in position to be advanced for a subsequent operation of the clutch. To avoid the possibility of any further shifting of the gear member 16, such as might occur by the backward passage of the lugs through the oblique grooves, resulting from a reversal of the direction of rotation of the driving shaft, or a sudden retardation of the movement of one of said shafts, the driven member may be shifted forward until the lugs pass the ends of the oblique grooves from which said lugs have just emerged; thereby insuring a positive engagement of the teeth and a positive transmission of power from one gear to the other, when the driven gear is turned in either direction.

The operation of disengaging the gear members consists merely in the longitudinal shifting of the gear member 16 in a direction away from the driving member 11, by the application of power to the manually operable device, in the opposite direction to that applied in the operation above described. During the backward shifting of the member 16, the lugs 18, 18 remain in the same grooves between the projections or ribs 13. During this movement of the driven member 16 the lugs 18 pass the admission ends of the slots simultaneously with the disengagement of the teeth and the gear members, so that no further turning movement of the driven member on the shaft will take place until the said driven member is again advanced to bring its teeth into initial engagement with those of the driving member, and the lugs are again brought opposite, or in position to enter, the receiving ends of the oblique slots. Said driven member is finally brought to rest in its original position relative to the driving member 11, but in each movement thereof into clutching position it will be rotated about the shaft through a distance corresponding to the circumferential width of one projection or rib plus that of one of the grooves. It follows, that in repeated operations of the device, the lugs turn or move forward progressively with respect to the ribs on the shaft, each lug passing from one longitudinal groove to the next one in advance of it, each time the gears are thrown into mesh with each other.

A device of the character described may be variously modified in construction without departing from the essential principles of construction embodied in my invention, and I do not, therefore, desire to be limited to the features of construction and arrangement illustrated, except so far as the same may be pointed out in the appended claims as constituting features of my invention.

I claim as my invention—

1. The combination of a shaft and two toothed gear members, one of which is mounted on said shaft and is adapted for endwise shifting and rotative movement thereon, said shaft and its associate gear member being provided one with a longitudinal groove and a longitudinal rib, having an oblique groove therein, and the other with a lug, said lug being adapted to coact with said oblique groove for effecting endwise advance movement of the gear member on the shaft, when the said gear member is turned relatively to the shaft, and to slide in said longitudinal groove in the backward shifting movement of the gear member on the shaft.

2. The combination of a shaft and two toothed gear members, one of which is mounted on said shaft and is adapted for endwise shifting and rotative movement thereon, said shaft and its associated gear member being provided one with a plurality of longitudinal grooves and intermediate ribs, each having an oblique groove, and the other with a lug; the said lug being adapted for engagement with said oblique grooves when the gear member is turned relatively to the shaft, and for engagement with said longitudinal grooves when the said gear member is shifted endwise on the shaft.

3. The combination of a shaft and two toothed gear members, one of which is mounted on said shaft and is adapted for endwise shifting and rotative movement thereon, said shifting member being provided with a lug having opposite oblique faces; and said shaft being provided with a plurality of longitudinal grooves and intermediate ribs, having each an oblique groove, said lug being adapted to engage the said grooves when the gear member is turned relatively to the shaft, and to engage said longitudinal grooves when the gear member is shifted endwise on the shaft.

4. The combination of a shaft and two toothed gear members, one of which is mounted on said shaft and is adapted for endwise shifting and rotative movement thereon, said shifting member being provided with a plurality of annularly arranged lugs, and said shaft being provided with a plurality of longitudinal grooves and intermediate ribs, having each an oblique slot; the lugs of said shifting gear member being adapted for engagement with the said oblique slots when the gear member is turned on the shaft and for engagement with the longitudinal grooves when the gear member is shifted endwise on the shaft.

In testimony, that I, claim the foregoing as my invention I affix my signature in the presence of two witnesses, this 24th day of April, A. D. 1912.

LEON J. CAMPBELL.

Witnesses:
  GEORGE R. WILKINS,
  EUGENE C. WANN.